United States Patent [19]

Feist

[11] 4,250,674
[45] Feb. 17, 1981

[54] PANELS FOR CLADDING FLOORS, WALLS AND CEILINGS OF ROOMS

[76] Inventor: Artus Feist, Weidenweg 9, Bensberg-Refrath, Fed. Rep. of Germany, 5060

[21] Appl. No.: 859,523

[22] Filed: Dec. 12, 1977

[30] Foreign Application Priority Data

| May 6, 1977 [DE] | Fed. Rep. of Germany | 2720361 |
| May 26, 1977 [DE] | Fed. Rep. of Germany | 2723793 |
| Jun. 3, 1977 [DE] | Fed. Rep. of Germany | 2725071 |
| Sep. 21, 1977 [DE] | Fed. Rep. of Germany | 2742429 |

[51] Int. Cl.² ............................................. E04B 4/58
[52] U.S. Cl. ................................ 52/220; 52/508; 52/590
[58] Field of Search ............. 52/220, 27, 618, 177, 52/503, 316, 180, 181, 508, 590; 165/56, 170

[56] References Cited

U.S. PATENT DOCUMENTS

| 2,278,554 | 4/1942 | Morton | 52/180 X |
| 2,567,716 | 9/1951 | Kritzer | 52/220 X |
| 3,037,746 | 6/1962 | Williams | 52/220 X |
| 3,699,926 | 10/1972 | Stockl | 52/177 X |

FOREIGN PATENT DOCUMENTS

| 1929529 | 7/1976 | Fed. Rep. of Germany . | |
| 1219084 | 12/1959 | France | 52/180 |
| 922886 | 4/1963 | United Kingdom | 52/220 |
| 991606 | 5/1965 | United Kingdom | 52/220 |
| 1408524 | 10/1975 | United Kingdom | 52/177 |

Primary Examiner—James A. Leppink
Assistant Examiner—Carl D. Friedman
Attorney, Agent, or Firm—Colton & Stone, Inc.

[57] ABSTRACT

Panels for cladding floors, walls and ceilings of rooms for locating ducting for carrying heating/cooling media for controlling the room temperature.

Mounting panels are formed from thermally insulating foamed plastics material with projections of different diameter in rows and columns to locate flexible tubing thereon. The mounting panels have jigsaw-like edges to allow for interlocking. The projections are solid and flat structural panels typically of steel or aluminium and adapted to be screwed or glued to the protrusions. Location of the structural panels is assisted by annular rims on the underside thereof around the screw holes, which penetrate into the projections.

Methods of moulding the mounting panels from foamed polystyrene are described and a preferred form of mould to give differential foaming.

A fixing screw having particular relationships between thread and core dimensions is described for securing to foamed plastics materials and the like.

25 Claims, 17 Drawing Figures

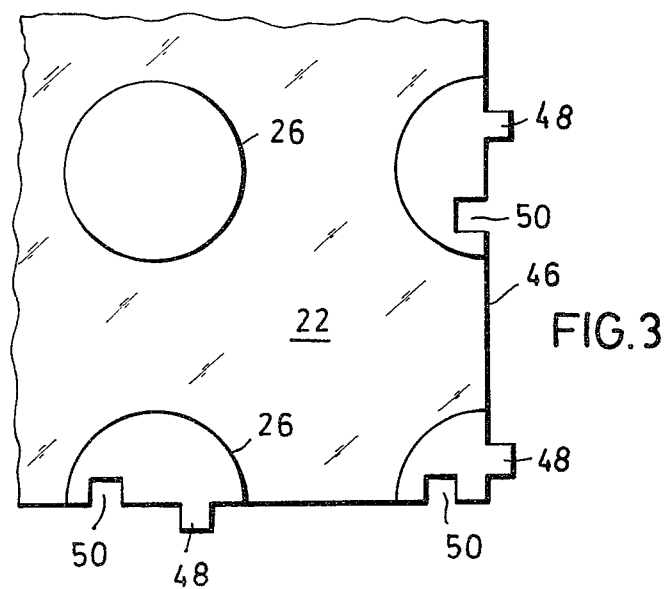
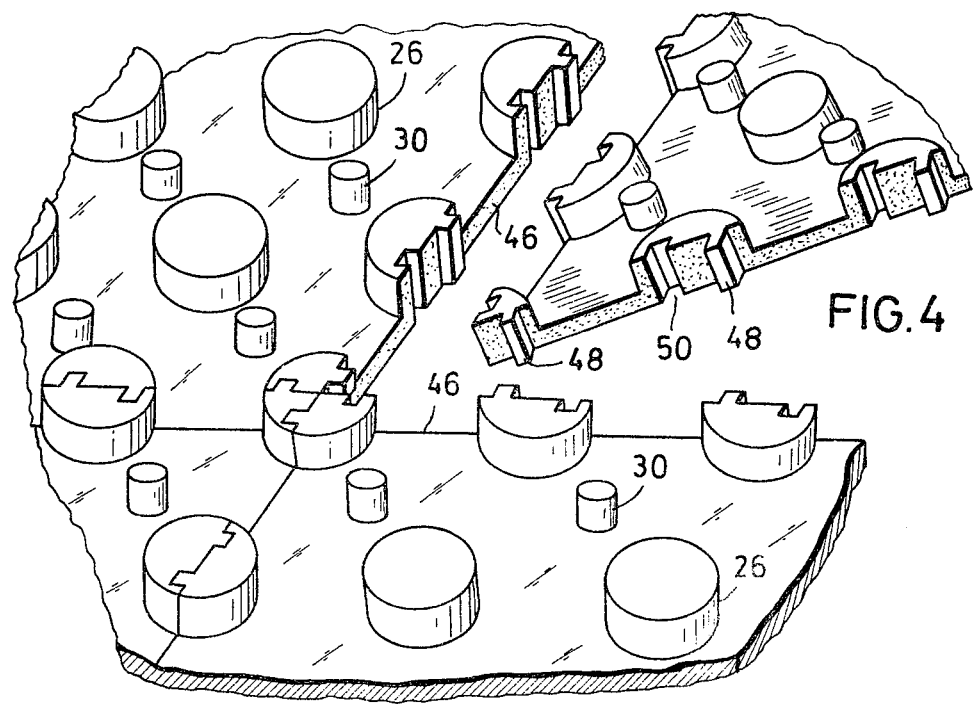

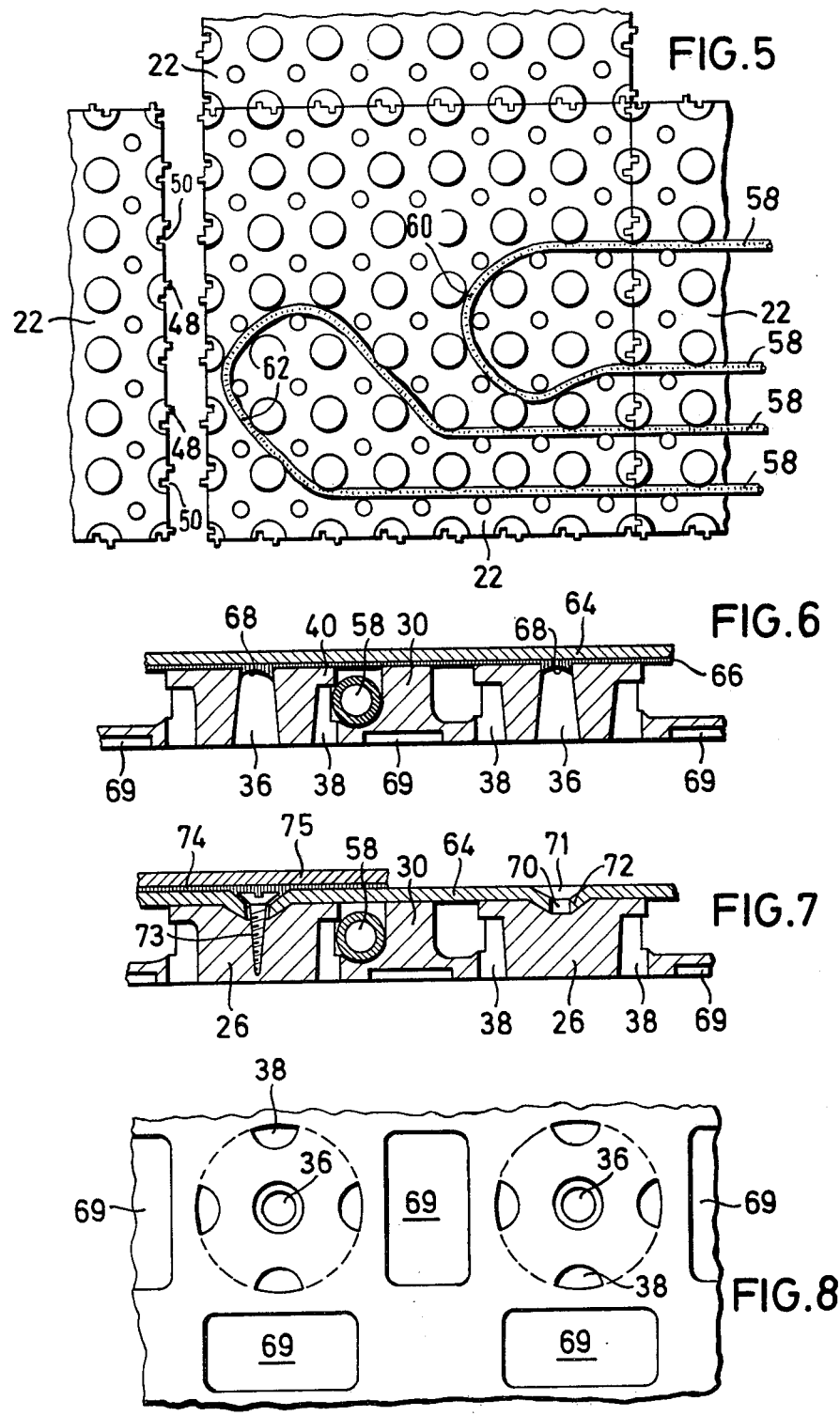

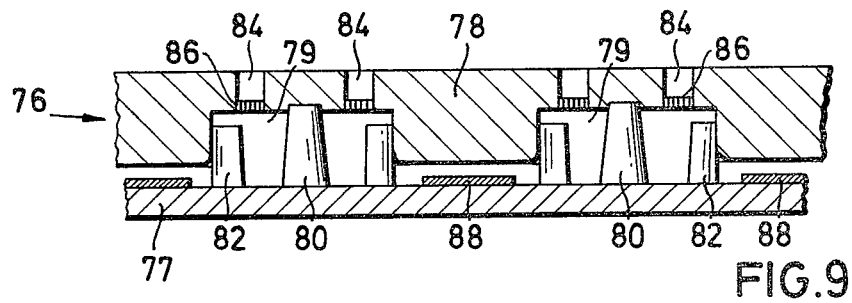
FIG.9
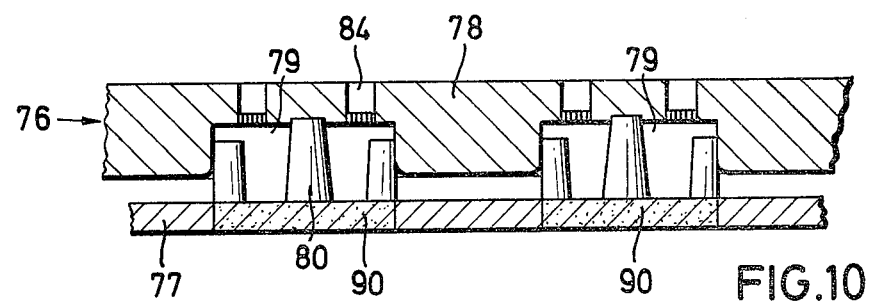
FIG.10
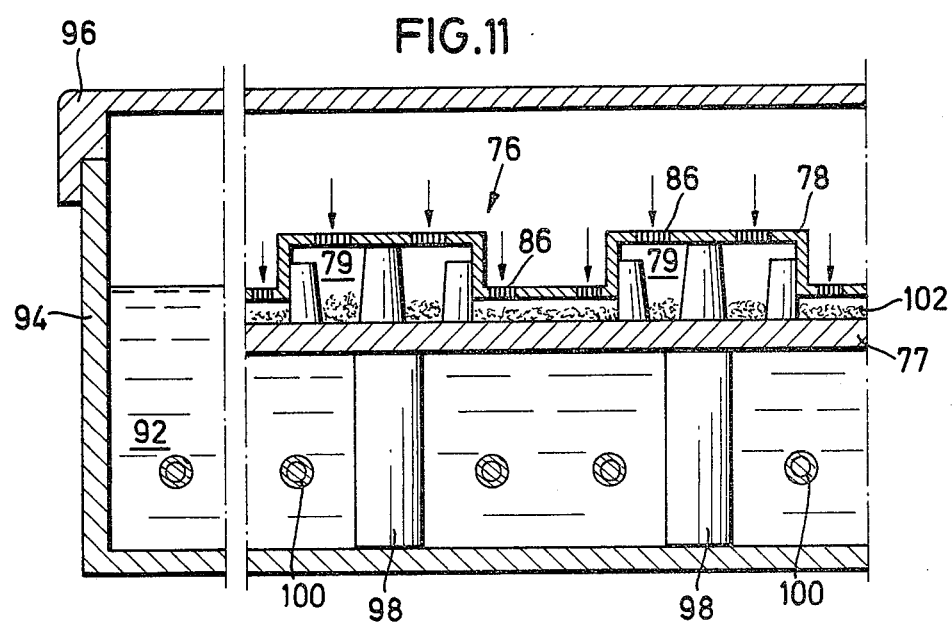

PANELS FOR CLADDING FLOORS, WALLS AND CEILINGS OF ROOMS

FIELD OF INVENTION

The invention relates to a mounting panel for securing heating and cooling ducting, a process for producing these mounting panels, apparatus for carrying out this process and fixing screws for use with this panel.

BACKGROUND TO THE INVENTION AND PRIOR ART

A mounting panel for securing heating medium ducting in floors is known from German Patent specification No. 1,929,529, made of a base plate with planar parallel sides, with cylindrical projections arranged on one side, between which the heating medium ducting can be secured (DT-AS No. 1,929,529). These mounting panels are laid in a building on a supporting base made of concrete, wood or the like, or on an insulating layer. Heating medium ducting which is connected at its ends to the flow and return of a central heating system is inserted according to a specific layout between the projections and is held in place by them. Steel plates are laid on the projections. These form the floor which is actually walked on. In the known mounting panel the cylindrical projections have a uniform diameter. This diameter is determined by two factors, which determine the maximum and minimum diameters which can be used. From the point of view of high load-bearing capacity and in order to give a substantial support for the structural panels (typically steel plates) laid thereon, the projections should have a large diameter. Only then will the steel plates be adequately supported and, particularly with point loading, be prevented from bending down in between the individual projections and rising up along their edges. However, projections with a large diameter restrict the free laying of the heating medium ducting. The space occupied by large diameter projections is no longer available for the ducting. This does not affect so much the straight runs of ducting as it does loops and return bends. At points where the ducting reverses its laying direction, it should follow the widest possible curve. In the known mounting panel a compromise has therefore to be made in establishing the diameter of the projections. This means that either the supporting of the steel plates or the possibility of laying the heating ducting freely must suffer.

OBJECTS OF THE INVENTION

It is an object of the present invention to provide a mounting panel on which structural sheets can be optimally supported and in which heating or cooling medium ducting can be laid with optimum freedom.

It is another object of the present invention to provide a mounting panel which can be incorporated into a floor and also into the walls and ceiling of a room.

It is a further object of the present invention to provide an improved screw for securing a structural panel such as a metal sheet to the improved mounting panel.

THE INVENTION

According to the invention in a mounting panel the projections have various diameters.

In a panel embodying the invention the number of the projections can be greater for the same total surface area than for a known panel and the spacing between the projections can therefore be reduced.

When incorporated into a floor the structural panels will therefore be supported at more points and the unsupported area is reduced. This means that the thickness of the structural panels can be reduced, typically in the case of steel sheets for a floor, to around 1.2 mm.

Despite this greater support for the steel plates, the total surface area of the projections need not be increased and space is available between the individual projections for laying the heating ducting freely in a variety of ways. For example, the transitional curve between two sections of ducting which run in opposite directions can have a diameter which is greater than the distance between these two sections of ducting. The ducting is therefore not subjected to as much stress on the outside of the transitional curve as would be the case if the curve had the diameter equal to the distance between the two sections of ducting, as would be the case if the projections all had the same diameter.

The projections are preferably arranged in straight parallel runs, with all the projections in a row being the same size. Where there are only two sizes the rows alternately contain larger and smaller projections and preferably those in one row are staggered or offset in relation to those in adjoining rows. Conveniently the spacing between adjoining rows is constant and is related to the diameter of the larger or smaller projections.

In order to hold the ducting inserted between the projections, it has been found advisable for the dimensions to be such that the distance between the tangent to the projections in two adjoining lines, which define the free space between the two lines of projections should be approximately equal to the diameter of the ducting; the diameter of a larger projection should be approximately equal to three times the ducting diameter and the diameter of a smaller projection should be approximately equal to the diameter of the ducting. Ducting located between two adjoining rows, one of larger and one of smaller projections, therefore alternately touches larger and smaller projections.

Preferably the projections taper slightly towards the top so having a frusto-conical cross section. This makes it easier to remove the mounting panel from a mould used to produce it, and also facilitates the insertion of ducting between the lines of projections.

Preferably also, a cavity is formed in the upper surface of each projection which cavity also tapers towards its opening. Where the structural panels are, for example, glued onto the projections, and each panel is coated with an adhesive on its lower surface to a thickness of a few millimetres, before being pressed into position, some of the adhesive will be forced into the cavities and on hardening will form plugs in the cavities, which owing to the conical shape of the cavities (and therefore the plugs) will provide additional anchorage.

Preferably also recesses are provided in the side wall of each larger diameter projection, which recesses extend from the upper face of a baseplate from which the projections upstand and end a little way below the upper surface of the projection. When a ducting of appropriate diameters is inserted between a line of such projections and an adjoining line of smaller diameter the outer surface of the ducting is forced into these recesses in the larger projections and the non-recessed portion of each projection overlies the section of ducting lying in the recess. By employing such recessed projections the ducting is not only secured laterally but is held in contact with the baseplate by the larger projections, thus avoiding the problem sometimes experienced with prior mounting panels which sometimes buckled due to rigidity and to compensate for the curves extending parallel to the surface of the panel. This can be prevented by using recessed projections, thus simplifying the laying of the ducting, since the ducting has less tendency to spring out from between the projections, after it has been laid.

Conveniently each larger diameter projection has four recesses, offset from each other by 90°.

The dimensions of each mounting panel are preferably selected so that the edges of the mounting panel intersect the centres of lines of larger diameter projections, and alternate perpendicular protuberances and recesses along the panel edges can be engaged in recesses and protuberances of adjacent mounting panels, to force the panels together. This means that mounting panels can be arranged as required either in parallel rows or offset relative to each other, and can be interconnected at the same time.

The protuberances and recesses are arranged mutually spaced out according to a pre-determined pattern. Preferably they are provided on the intersected surface of the larger-diameter projections. Advantageously, for each projection one protuberance and one recess are provided, both equidistant from a centre line passing through what would be the centre of the projection if it were not cut in half. Where a projection is situated at the corner of a mounting panel and is intersected twice by the two perpendicular edges to form a right angled quadrant, a protuberance is provided on one cut surface and a recess in the other cut surface.

With a diameter of a projection of, say, six units of length, both a protuberance and a recess will typically have a width of one unit of length, and each will be located at a distance of one unit of length from an upright edge of the projection.

According to a preferred feature of the invention, the mounting panel is made of a synthetic rigid foam material.

In one embodiment it is made from a polystyrene, typically foamed to a density in the range 150 to 300 kg/m$^3$.

In another embodiment it is made from a polyurethane rigid foam.

In a third embodiment the mounting panel consists of a plastics sheet which is dished (for example by moulding) to form the projections in the surface thereof, and the hollow interiors of the projections are filled with a filler material, in particular with a synthetic rigid foam material.

Structural panels (such as metal sheets) are laid on the projections with the ducting lying between them. Each panel can be glued on, as already indicated. However according to another aspect of the invention another form of attachment comprises forming holes in the panels, each hole being countersunk to take the head of a screw and, optionally, having an annular protrusion around the hole on the underside of the panel to penetrate into the material which forms the projections (typically foam plastics material). The structural panels are laid on the projections and where provided the annular protrusions are forced into the projections by pressing the panel down, for example with the feet or by hammering. Thus where the annular protrusions are provided a considerable bond between the structural panel and the mounting panel is established right from the start, which prevents any relative lateral displacement. The structural panel may be further secured in position by screws located in the countersunk holes and screwed into the projections.

Mounting panels according to the invention can be secured to the floor, the ceiling or the walls of a room, where they can be used to secure both heating and cooling medium ducting. When laid on a floor, the structural panels to be laid on the projections are preferably made of steel plate to accommodate the high floor loads. When applied to a a wall or below a ceiling the structural panels are conveniently of lightweight metal, such as aluminium or an aluminium alloy.

There is a dry and wet method for producing a mounting panel according to the invention. A problem to be solved here consists in the fact that the plastics material granules have to be foamed in the mould to different depths. Thus, the granules in the vicinity of the projections have to be foamed to a greater depth and to a greater volume. Uneven filling of the mould with more granules in the vicinity of the projections would be very time-consuming and therefore expensive.

To eliminate this problem, in one method (the dry process) according to the invention the granules to be foamed in the mould are heated by the introduction of dry heat and the supply heat to individual points in the mould is controlled by the use of inserts of a material with poor thermal conductivity. Thus, the bottom box for the mould has inserts in the vicinity of the projections, made of material with poor thermal conductivity. This means that where the mould is heated from below the granules located above these inserts are not heated to foaming temperature until later, whilst the granules in the flat parts of the final mounting panel between the inserts, are heated and foam, earlier. This foam flows laterally over the still-cold granules lying in the hollow spaces in the mould which form the projections. After a specific delay, the granules located on top of the inserts then also foam and finally fill up any hollow spaces in the mould.

In another method (the wet process), the granules are foamed by the introduction of hot vapour into the mould.

A mould for carrying out the dry process comprises top and bottom halves and the base of the bottom half has inserts made of material with low thermal conductivity, which are located at the points where the granules have to foam to a large volume. In another development, the same aim is achieved by inserting displacement plates in the mould at the points where the granules have only to foam to a small volume. The mould is filled to an even depth with the granules, but the volume of the plates causes foaming granules to flow into the hollow spaces in the mould which form the projections.

A preferred plastics material which may be foamed to fill the mould is Polystyrene.

It was stated above that the structural panels may be glued or screwed onto the projections on the mounting panels. Fixing screws are in general known. The most commonly used is the so-called wood screw. In such screws there is a specific relationship between the diameter of the core and the depth of the thread, so that the diameter of the core exceeds the depth of the thread over the whole length of the wood screw. When the screw is screwed into wood a relatively large amount of wood is therefore forced back by the thick, solid core. This is possible because wood can be deformed. The particles of wood forced back by the solid core are taken up in the area surrounding the screw. Only rarely does the wood break open or split. The ability of wood to deform also enables its fibres to become lodged in the relatively narrow radial spaces between the separate turns of the thread, thus holding the screw securely in place.

With a foam plastics material which has been compacted to a high degree of relationships are different. Such a material is only slightly deformable. When a screw with a relatively thick core is screwed into it, it breaks up, assuming that the screw is sufficiently strong. The cohesion of the foam plastics material is damaged by the screwing in of thread. Insufficient material remains between the turns of the thread, which tend to be narrow in the radial direction, so that there is insufficient hold for the screw and it can be pulled out. When used on such materials a wood screw then fails to hold parts together or to connect one part to another part.

In accordance therefore with the said further object of the invention a fixing screw is required which achieves an adequate and permanent hold even in brittle materials with low deformability such as foamed plastics materials.

According to another aspect of the invention therefore a fixing screw is formed with a thread which is deep in comparison to the diameter of its core. It has been found unexpectedly that by adopting this simple design criterion, all of the above-mentioned problems are eliminated, and such a screw holds securely, even in brittle material with low deformability.

Depending on the compaction or density and the brittleness of the foam plastics material, the ratio of thread depth to core diameter can vary over a wide range, provided that it is always greater than the values known for wood threads. A ratio of thread depth to core diameter of at least 0.5:1 at the pointed end of the fixing screw and of at least 1:1 at the head end has proved to be satisfactory. It is advantageous for the ratio of the thread depth to the diameter of the core to be more or less exactly 0.5:1 at the point, and for it to be more or less exactly 1:1 at the head.

The diameter of the core is advantageously increased between the pointed end and the head end. In a preferred embodiment a constant increase up to approximately 2.5 times has proved particularly advantageous.

The absolute dimensions of the fixing screw depend on the purpose for which it is to be used. If the screw is to be used to attach approximately 1 to 2 mm thick steel plates to foam plastics blocks, then according to the invention satisfactory values are a core length of approximately 18 mm, a core diameter of approximately 1 mm at the point and a diameter of approximately 2.5 mm at the head.

The envelope curve of the thread profile can have different forms. The choice of any one specific form depends on the structure of the particular foam plastics material with which the screw is to be used. This can be more brittle or less brittle, more elastic or less elastic, and so on.

In one form the envelope curve of the thread profile is concentric and parallel to the diameter of the core and the o.d. of the thread thus increases in the same way as does the core diameter.

For other plastics materials the envelope curve of the thread profile has a constant diameter over about two thirds to three quarters of the length of the screw measured from the head, after which the diameter reduces rapidly to the point. In this form the sum of the diameters of the separate turns of the thread is higher than in the aforementioned form. This means that higher forces can be transmitted or greater contact pressures exerted, so long as the strength of the plastics material allows this.

A further form of envelope curve lies concentric and parallel to a constant core diameter over the greater part of its length and thus has a similarly constant diameter, and then reduces over a short section to the point.

The angularity of a thread profile depends on the angle between its two flanks or its axial length at the core and at the outer circumference. Greater angularity or more acute angularity makes screwing in easier, even in a hard material. With increasing angularity, however, the strength of the thread is reduced at the circumference. An expedient mean value for screwing into foam plastics material has proved to be obtained if the thickness of a thread from the core to its outer circumference is reduced to about 0.3 to 0.4 times the thickness of the core. With the absolute dimensions of the fixing screw already mentioned, a thickness of the thread course at the core of approximately 1 mm and at the outer circumference of approximately 0.3 to 0.4 mm is advantageous.

A thread pitch of one turn per 3.5 mm core length has proved satisfactory.

The invention will now be described by way of example with reference to the embodiments shown in the drawings.

IN THE DRAWINGS

FIG. 3 is a plan view of a mounting panel having protuberances and recesses for interconnecting with other panels, FIG. 4 is a perspective view of adjacent mounting panels, showing in particular their interlocation, FIG. 5 is a schematic plan view of several mounting panels joined together with inserted heating or cooling medium ducting, FIG. 6 is a perpendicular cross-section through a mounting panel embodying the invention.

Figure 12:
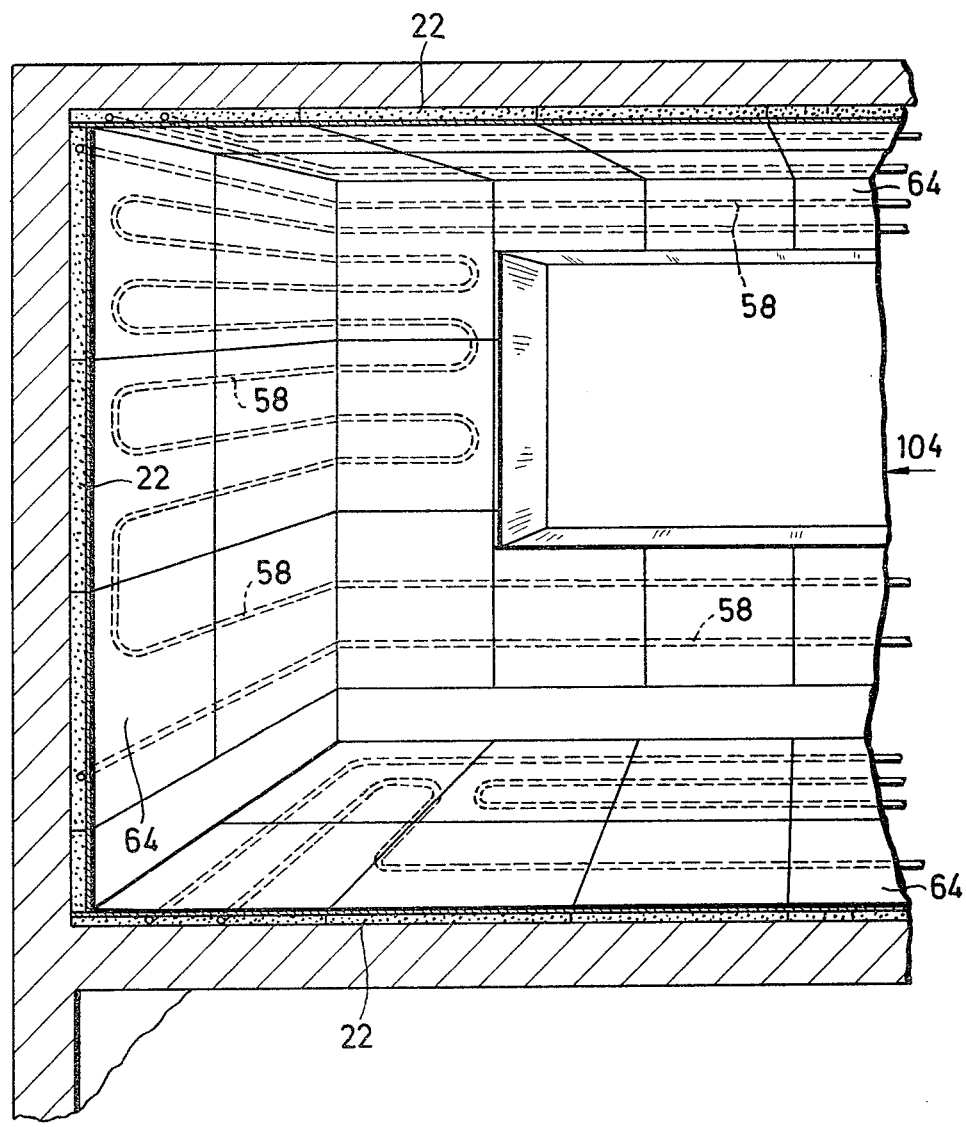
Figure 13:
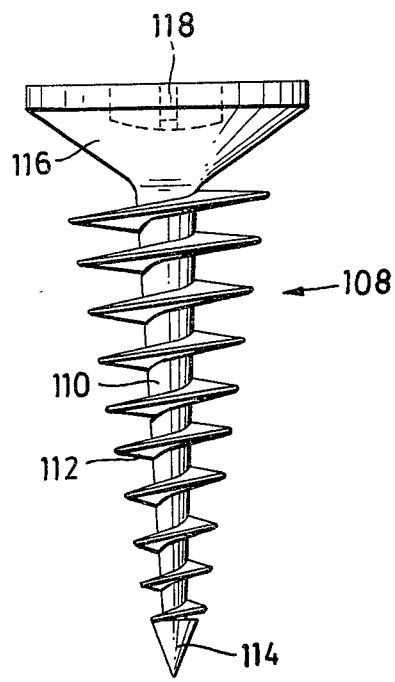
Figure 14:
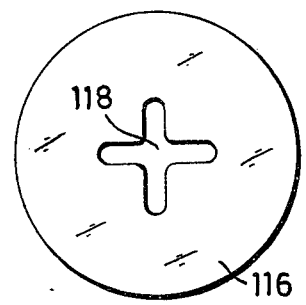
Figure 15:
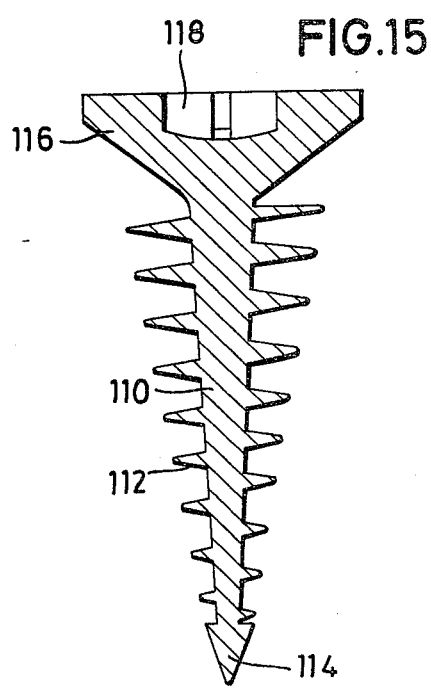
Figure 16:
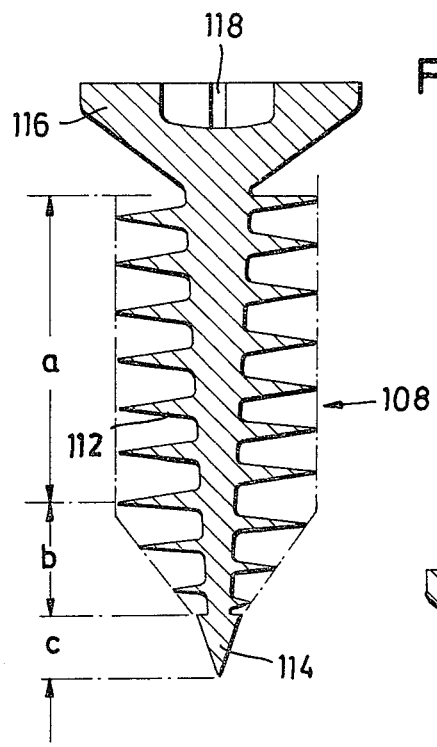
Figure 17:
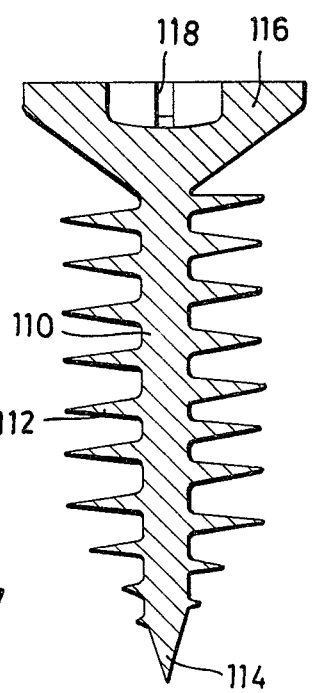

FIG. 7 is a perpendicular cross-section through another mounting panel, embodying the invention, FIG. 8 is a reverse plan view of a mounting panel, i.e. as viewed from below, FIG. 9 is a cross-section through a first embodiment of a mould for producing the mounting panel by a so-called dry method, FIG. 10 is a cross-section similar to FIG. 9 through a second embodiment of mould for producing the mounting panel by the so-called dry method, FIG. 11 is a cross-section through a mould using a so-called wet method, FIG. 12 is a perspective view of part of a room with mounting panels positioned on the floor, on the walls and on the ceiling, FIG. 13 is a side view of one embodiment of a fixing screw having a core with continuously varying diameter, FIG. 14 is an end view of the head of this screw, FIG. 15 is a longitudinal section through the embodiment of screw shown in FIG. 13, FIG. 16 is a section similar to FIG. 15, showing an embodiment of screw having a varying core diameter but constant external thread diameter, over the greater part of the length of the screw, and FIG. 17 is a section similar to FIG. 16, showing an embodiment with constant core diameter and virtually constant thread diameter.

DESCRIPTION OF EMBODIMENTS

Figure 1:
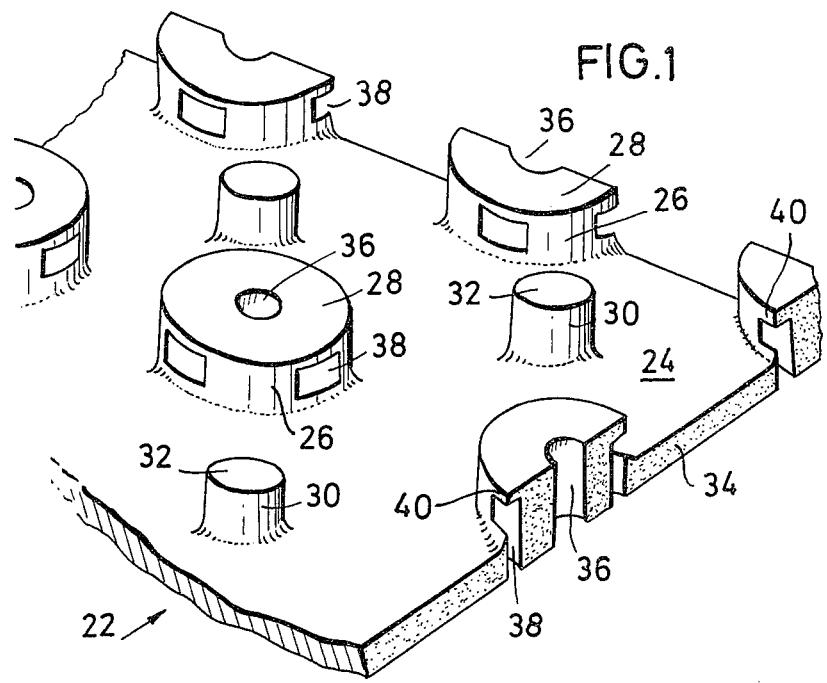
FIG. 1 is a perspective view of part of one embodiment of a mounting panel.

The mounting panel shown in FIG. 1 consists of the base panel 24 which has moulded onto it the wide or large diameter projections 26 with bearing surfaces 28 and the narrow or small diameter projections 30, with the bearing surfaces 32. The mounting panel 22 consists of rigid foam 34. In the wide, large-diameter projections 26 there are conical central openings 36. In their circumference there are recesses 38, the upper ends of which are defined by overhanging parts of the surface of the projections, which form protuberances 40.

Figure 2:
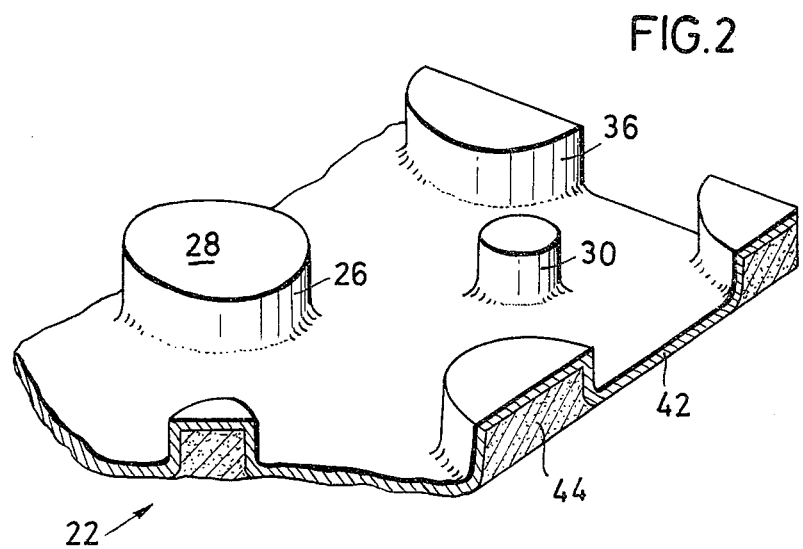
FIG. 2 is a perspective view of part of a second embodiment.

The form of construction of the mounting panel 22 can best be seen in FIG. 2 and consists of a dished sheet of foil 42. In the vicinity of the projections 26 and 30 it is filled with a filler 44. In the example shown this embodiment of the mounting panel 22 has no central openings 36 or recesses 38.

FIGS. 3 and 4 show the mutual interlocating of adjacent mounting panels 22 when these are joined together. The end faces 46 of the mounting panels 22 run centrally through the large-diameter projections 26. These have protuberances 48 and recesses 50 formed along each edge of the plate. These all have the same dimensions. As shown in FIG. 4, the protuberances and the recesses on adjacent mounting panels engage in each other. FIG. 4. shows edge sections of three already installed mounting panels and the edge section of a fourth panel which is just about to be installed between the three panels already installed.

In FIG. 5 four mounting panels 22 are shown schematically. Two loops of ducting are inserted between the projections. Both loops contain straight ducting sections 58. The two straight sections 58 of the upper loop are connected together via a curve 60. Its diameter 60 is greater than the distance between the straight ducting sections 58. This is made possible since in the vicinity of the narrow projections 30 (which are not completely drawn in in detail) there is sufficient free space to lay the ducting in the required shape, thus along the large arc of a circle. The two ducting sections 58 of the lower loop are connected together via an out-swung curve 62. Even for the straight ducting sections 58, which extend generally parallel to the walls of the room, numerous laying configurations are possible. For example, the ducting sections 58 can be laid in wave formation or obliquely in the free spaces between the narrow projections 30 to increase the ducting density.

FIG. 6 shows a vertical section through two wide projections 26 and a narrow projection 30 which lies between them. It can be seen how the left-hand region of a ducting section 58 has entered into a recess 38 and how the protuberance 40 engages over this region. This holds the ducting 58 securely in the vertical direction. It cannot become displaced laterally towards the right as it rests there against a narrow projection 30, behind the plane of the drawing.

A metal sheet 64 lies on the projections. Its lower face is coated with an adhesive 66. When the metal sheet 64 is pressed on the projections the adhesive is partly formed into the central opening 36. Plugs 68 are formed. These plugs adhering to the metal plate 64 form additional anchorage.

FIGS. 6 and 7 show rectangular recesses 69 in the base of the mounting panel. These are located between the wide projections 26. They are caused by displacement plates inserted in the mould during the foaming process. These displacement plates cause the granules to be displaced into the hollow spaces in the mould which form the wide projections.

In the construction form shown in FIG. 6 the metal sheets 64 are held by the adhesive 66. The strength of the projections 26 has proved to be sufficiently high, however, for it to be possible also to screw the metal sheets onto them. FIG. 7 shows this construction form. Holes 70 are punched in the metal sheets 64. When these holes are punched, a recess 71 and a pushed-through edge or a protuberance 72 is formed. When a floor is laid, for example, the metal sheets 64 are trodden down securely with the feet after they are laid on the mounting panels 22. This forces the pushed-through edges or protuberances 72 into the bearing surfaces of the projections. This fixes them securely against lateral displacement right from the start, without gluing or screwing. Plate screws 73 are then screwed through the holes 70 into the projections. In the example shown in FIG. 7 the wide projections 26 do not have any central openings 36 and the screws 73 are screwed into the projections 26 exactly in the centre. However, FIG. 8 shows that there would still be enough material available for the screws 73 if projections with central openings 36 were used. Some mastic 74 is put on the metal sheet 64. Some floor covering 75, such as plastic tiles, for example, is laid on the mastic 74. The mastic 74 itself is forced into the recesses 71 and into the recesses and gaps formed by and in the heads of the screws. In this way, the screw heads and the floor covering 75 are additionally secured against slipping sideways.

FIGS. 9 and 10 show two construction forms of the mould 76 operating by the dry method. The mould 76 consists of the bottom box 77 and the upper box 78. The upper box 78 encloses the hollow space 79 of the mould. The hollow spaces 79 for forming the wide projections 26 lie in the plane of the section. There is a central core 80 to form the conical central opening 36 and shorter edge cores 82 to form the recesses 38. Above the hollow spaces 79 in the mould there are venting openings 84. They are closed off by gauze inserts 86. Displacement plates 88 are inserted between the hollow spaces 79 in the mould. As a special feature, the construction form shown in FIG. 10 has inserts 90 made of a material with low thermal conductivity. These inserts are located under the hollow spaces 79 in the mould. They can be used in the hollow spaces 79 in the mould both for the wide projections and for the narrow projections.

The mould is filled with granules, closed and then heated. In the construction form shown in FIG. 9 the softened granules pressed by the displacement plates 88 flow away laterally and enter into the hollow spaces 79 in the mould. This means that there are sufficient granules in these to obtain the desired high density. In the construction form shown in FIG. 10, the granules located on top of the inserts 90 are not heated up until later. The granules located between the inserts are heated up without any delay, so that they are therefore softened, and flow over the still-cold granules located in the hollow spaces 79 in the moulds, on top of the inserts 90. After a time lag, these granules located on top of the inserts 90 also form. In this way the hollow spaces 79 in the mould are also filled, in this instance with additional granules penetrating from the sides, and a high density is ensured.

In FIG. 11 the mould operating by the so-called wet method is shown. The mould 76 is installed in a water bath 92. This is located in a box 94, which is closed by a covering plate 96. The mould stands on supports 98. Heating elements 100 heat the water bath. Foam granules 102 are shown in the mould. During the heating process, water vapour penetrates into the mould through the gauze inserts 86, from above. This is indicated with arrows. Under the effect of this heating vapour the granules foam and completely fill the hollow spaces in the mould.

FIG. 12 shows the universal application of a mounting panel 22 according to the invention, both for the floor, walls and also for the ceiling of a room 104. In the example shown, the mounting panels 22, the sections 58 of ducting held by its projections and the metal sheets 64 lying on top are installed on the floor, walls and ceiling of the room 104. On the floor metal sheets 64 made of steel are laid, in order to take the high floor loads. On the other hand, metal sheets 64 laid on the walls and ceiling consist of a lightweight metal alloy. The ducting laid on the floor, walls and ceiling is supplied according to requirements, for heating or for cooling, with a heating medium, generally hot water, or a cooling medium, generally cold water. This has the great advantage that a room can be fully air-conditioned, i.e. it can be heated or cooled, with the same equipment, that is, mounting panels, ducting and metal sheets.

The fixing screw with which the metal sheets are screwed onto the mounting panels will now be described with reference to FIGS. 13 to 17. The fixing screw 108 consists of a core 110 with a helical thread form 112, a point 114 and a head 116. The cruciform-slit 118 is located in the latter.

FIGS. 13 and 15 clearly show the completely different shape of the fixing screw according to the invention compared to conventional screws. The thread courses are very deep compared to the core. A considerable amount of material is left between these deep thread courses. This results in secure holding of the screw. The large free space between the thread courses also means that despite the large overall diameter only a small amount of material is pressed out when the screws are screwed in. Breaking up and splitting are thus prevented.

With the construction form shown in FIG. 16, the core 110 has a constantly decreasing diameter between the head 116 and the point 114, as in the construction form shown in FIG. 13. The diameter of the thread courses 112 is constant over a section (a) from the head 116 onwards for about two thirds to two quarters of the total length. Over the remaining section (b) the diameter of the thread courses 112 decreases and then proceeds over the section (c) to the diameter of the point 114.

In the construction form shown in FIG. 17 both the core 110 and the thread courses 112 have a constant diameter over the greater part of the length. Only in the vicinity of the point 114 is the diameter of the thread courses 112 located there reduced.

I claim:

1. A base panel for use in a surface facing system, said panels serving to support heating/cooling media ducting and to carry face plates covering said ducting, said base panel having a substantially planar face adapted to be secured to said surface and, on the opposite face thereof, a plurality of first projections and a plurality of second projections, each of said first and second projections being of generally cylindrical configuration with the diameter of said first projections being greater than the diameter of said second projections, said first and second projections each being located in uniformly spaced rows with rows of said first and second projections alternating, the free space between adjacent ones of said rows being of a width substantially equal to the external diameter of said ducting.

2. The panel of claim 1 wherein said base panel is formed of a thermally insulating material and said face plate is formed of a thermally conductive material.

3. The panel of claim 1 wherein the projections in one row are offset in relation to those in adjoining rows.

4. The panel of claim 3 wherein each of said projections is located at the midpoint of a square the corners of which are defined by the four most closely adjacent projections.

5. The panel of claim 1 wherein the diameter of each of said first projections is approximately equal to three times the external diameter of said ducting and the diameter of each of said second projections is approximately equal to said external diameter of said ducting.

6. The panel of claim 5 wherein each of said projections is located at the midpoint of a square the corners of which are defined by the four most closely adjacent projections.

7. The panel of claim 5 wherein recesses are provided in the side wall of each of said first projections, said recesses extending from the base of said projection to a point closely adjacent the end thereof.

8. The panel of claim 7 wherein four such recesses are provided in each projection.

9. The panel of claim 1 wherein the projections taper towards the top so possessing a frusto-conical cross-section.

10. The panel of claim 1 wherein a cavity is formed in the upper surface of at least some of the projections which cavity tapers towards its opening.

11. The panel of claim 1 wherein the dimensions of said base panel are such that the edges of said panel intersect the centers of lines of said first projections and in these edge faces alternate protuberances and complementary recesses are provided for fitting similar recesses and protuberances along the edge faces of adjoining panels, for fitting the panel together.

12. The panel of claim 11 wherein said protuberances and complementary recesses are provided in the intersected surfaces of said first projections.

13. The panel of claim 12 wherein one protuberance and one complementary recess are formed in the intersected surface of each projection, both at an equal distance from the center of the circle of which the projection forms a part, and also equidistant from the perpendicular edges of the intersected surface of the projection.

14. The panel of claim 13 wherein a projection which is situated at a corner of the mounting panel and is intersected twice by the two perpendicular edges to form a right-angled quadrant, is formed with a protuberance on one cut surface and a complementary recess on the other cut surface.

15. The panel of claim 1 wherein said base panel is formed from foamed polystyrene.

16. The panel of claim 15 wherein said polystyrene is foamed to a density in the range of 150 to 300 Kg/m$^3$.

17. The panel of claim 1 wherein said base panel is formed from rigid polyurethane foam.

18. The panel of claim 1 wherein said base panel comprises a plastic sheet contoured to form said first and second projections and a filler material filling the interiors of said projections.

19. The panel of claim 1 wherein said face plate comprises a sheet of thermally conductive material having countersunk holes therethrough at locations corresponding to at least certain of said projections and wherein said means for securing comprises screws passing through said holes and threaded into said lastmentioned projections.

20. The panel of claim 19 wherein an annular protrusion is formed on the underside of said face plate around each of the said countersunk holes, which protrusions are adapted to penetrate into the material forming the projections of said base panel.

21. The panel of claim 19 wherein said face plate is metal.

22. The panel of claim 21 wherein said face plate is steel.

23. The panel of claim 21 wherein said face plate is a lightweight metal.

24. The panel of claim 21 wherein said face plate is aluminum.

25. The panel of claim 1 wherein said base panel is adapted to be mounted as an intermediate cladding member for any of the floor, walls or ceiling of a room and serving to locate ducting adapted to carry a fluid medium for heating or cooling said room.

* * * * *